United States Patent
Nave

(10) Patent No.: US 6,958,448 B2
(45) Date of Patent: Oct. 25, 2005

(54) TOOL FOR INSTALLING AN ELECTRICAL BOX

(76) Inventor: Gerald A. Nave, 1810 W. Lakeview Dr., Johnson City, TN (US) 37601

(*) Notice: Subject to any disclaimer, the term of this patent is extended or adjusted under 35 U.S.C. 154(b) by 25 days.

(21) Appl. No.: 10/813,460

(22) Filed: Mar. 30, 2004

(65) Prior Publication Data

US 2005/0056448 A1 Mar. 17, 2005

Related U.S. Application Data

(60) Provisional application No. 60/499,636, filed on Sep. 3, 2003.

(51) Int. Cl.[7] .................................................. H01H 9/02
(52) U.S. Cl. ............................ 174/58; 174/60; 174/63; 174/64; 174/50; 33/528
(58) Field of Search ............................. 174/58, 60, 63, 174/64, 50; 220/3.2, 3.9, 4.02; 248/906; 33/528, DIG. 10

(56) References Cited

U.S. PATENT DOCUMENTS

| | | | |
|---|---|---|---|
| 3,251,130 A | * | 5/1966 | Miles ........................... 30/358 |
| 4,635,372 A | | 1/1987 | Tande |
| 5,072,523 A | | 12/1991 | Bennett |
| 5,361,509 A | * | 11/1994 | Wheeler et al. ............... 33/528 |
| 5,758,430 A | | 6/1998 | Holloway |
| 5,992,036 A | * | 11/1999 | Cannelli, Jr. .................. 33/528 |
| 6,756,541 B1 | * | 6/2004 | Mollick et al. ................ 174/58 |
| 6,800,806 B1 | * | 10/2004 | Grday ........................... 174/50 |

* cited by examiner

*Primary Examiner*—Dhiru R. Patel
(74) *Attorney, Agent, or Firm*—Carter, DeLuca, Farrell & Schmidt LLP

(57) ABSTRACT

A tool for installing an electrical box is provided. The tool includes a holding assembly for holding an electrical box to be mounted on a framing member; a depth adjuster for positioning the electrical box a predetermined distance relative to a face of the framing member; and a height adjuster for positioning the electrical box a predetermined height relative to a floor, wherein the holding assembly includes a rectangular shaped holding member for holding the electrical box, wherein a width of the holding member is less than a height of an opening of the electrical box and the depth adjuster is L-shaped and has a first end for abutting the framing member to set the electrical box at the predetermined distance relative to the face of the framing member. The height adjuster includes a support member, e.g., conduit, for positioning the tool at the predetermined height.

24 Claims, 6 Drawing Sheets

TOOL FOR INSTALLING AN ELECTRICAL BOX

PRIORITY

This application claims priority to an application entitled "TOOL FOR INSTALLING AN ELECTRICAL BOX" filed in the United States Patent and Trademark Office on Sep. 3, 2003 and assigned Ser. No. 60/499,636, the contents of which are hereby incorporated by reference.

BACKGROUND OF THE INVENTION

1. Field of the Invention

This disclosure pertains generally to devices and methods for the installation of electrical boxes for electric power receptacles and the like, and more particularly to an electrical box setting guide apparatus for use on wood and metal wall studs which provides for quick, easy and accurate vertical and horizontal positioning of electrical boxes on studs or framing members.

2. Description of the Related Art

During construction of residential, commercial and other building structures, electrical boxes are generally installed in walls by attaching the electrical boxes to studs or framing members in the wall prior to covering the wall with drywall or sheet rock. The electrical boxes generally must be placed at a uniform height or elevation from the floor, and must be positioned to allow installation of the drywall sheets. Prior to installation of the drywall, the electrical boxes are attached to the sides of the stud so that the front face or edge of the electrical box will be flush with the surface of the subsequently installed drywall. When wood studs are utilized in a wall, the front face of the electrical box is generally set out or positioned to extend outward from the front surface of the stud, and the drywall later installed covers the front surface of the stud. With the use of metal studs, the electrical boxes are generally positioned or set with the front face of the box being flush with the front edge of the stud, and the drywall is later installed to abut the stud without covering it.

Typically, a person installing electrical boxes on studs will determine positions for the boxes with a tape measure by measuring and marking a horizontal distance from the front or outer face of the stud as required by the drywall thickness, and measuring and marking a vertical distance from the floor along the stud as required for the height of the electrical fixture carried by the electrical box. In the case of wood studs, the electrical box is generally nailed to the stud at the measured position. With metal studs, holes are drilled in the stud at the marked position, and the electrical box is attached thereto by screws or bolts.

The above positioning procedure is prone to inaccuracy and frequently can lead to incorrect positioning of electrical boxes. If an error occurs in the horizontal positioning, the drywall or sheet rock will not be flush with the edge of the electrical box. The box must be detached, repositioned so that the electrical box is flush with the drywall, and again reattached to the stud, resulting in inconvenience and delay. Failure to reposition the electrical box results in an uneven drywall finish around the electrical box. Incorrect vertical positioning of the electrical boxes must also be corrected by detachment, repositioning and reattachment or otherwise the electrical fixtures along the wall will be at different elevations, which detracts from the appearance of the finished wall. Presently, there are no devices or methods available which overcome the difficulties involved in positioning or setting electrical boxes on studs.

Thus, there is a need for an electrical box installation which allows quick, easy and accurate vertical and horizontal positioning of electrical boxes on framing members or studs, which automatically positions the electrical box to be flush with subsequently installed drywall sheets, and which can be used with both wood and metal studs.

SUMMARY OF THE INVENTION

A tool for installing an electrical box is provided.

According to an aspect of the present disclosure, a tool for installing an electrical box includes a holding assembly for holding an electrical box to be mounted on a framing member; a depth adjuster for positioning the electrical box a predetermined distance relative to a face of the framing member; and a height adjuster for positioning the electrical box a predetermined height relative to a floor.

The holding assembly includes a rectangular shaped holding member for holding the electrical box, wherein a width of the holding member is less than a height of an opening of the electrical box and the depth adjuster is L-shaped and has a first end for abutting the framing member to set the electrical box at the predetermined distance relative to the face of the framing member. The tool further includes a handle for positioning the tool in relation to the framing member.

According to another aspect of the present disclosure, the height adjuster includes a device for coupling a support member to the tool, wherein the support member positions the tool at the predetermined height. The coupling device is rotatable so the electrical box can be installed on a left side or right side of the framing member. The support member may be electrical metallic tubing (EMT), a rod or a wooden stick.

According to a further aspect of the present disclosure, the depth adjuster includes a longitudinal slot for allowing the depth adjuster to slide relative to the holding assembly for setting the predetermined distance, wherein the slot includes a plurality of graduations for setting the predetermined distance.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF PREFERRED EMBODIMENTS

Figure 1:
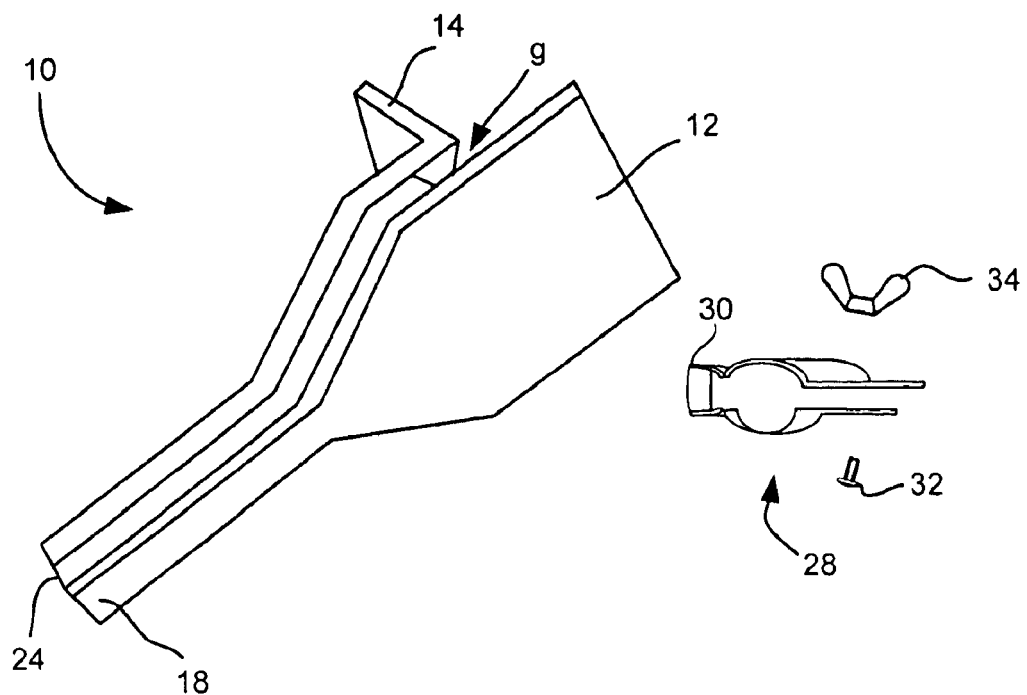
FIG. 1 is perspective view of a tool for installing an electrical box in accordance with an embodiment of the present disclosure.
Figure 2:
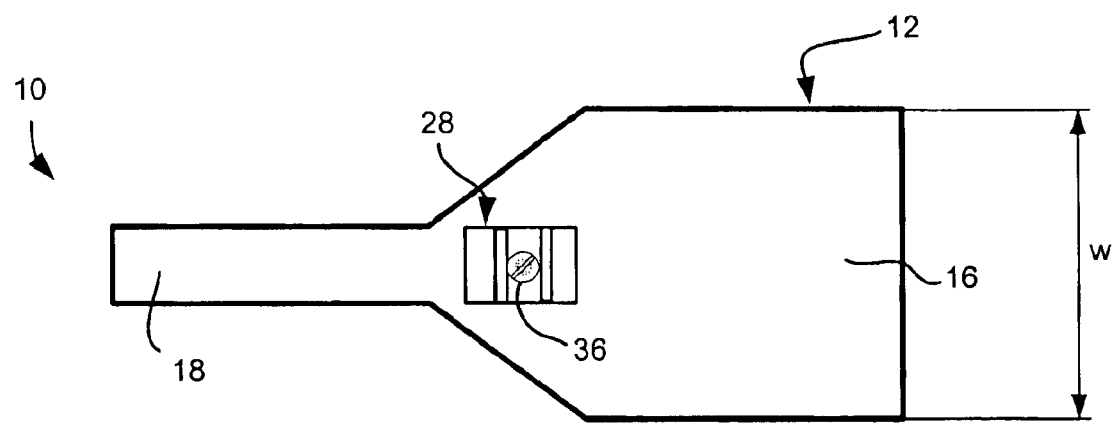
FIG. 2 is right side view of a tool for installing an electrical box in accordance with an embodiment of the present disclosure.
Figure 3:
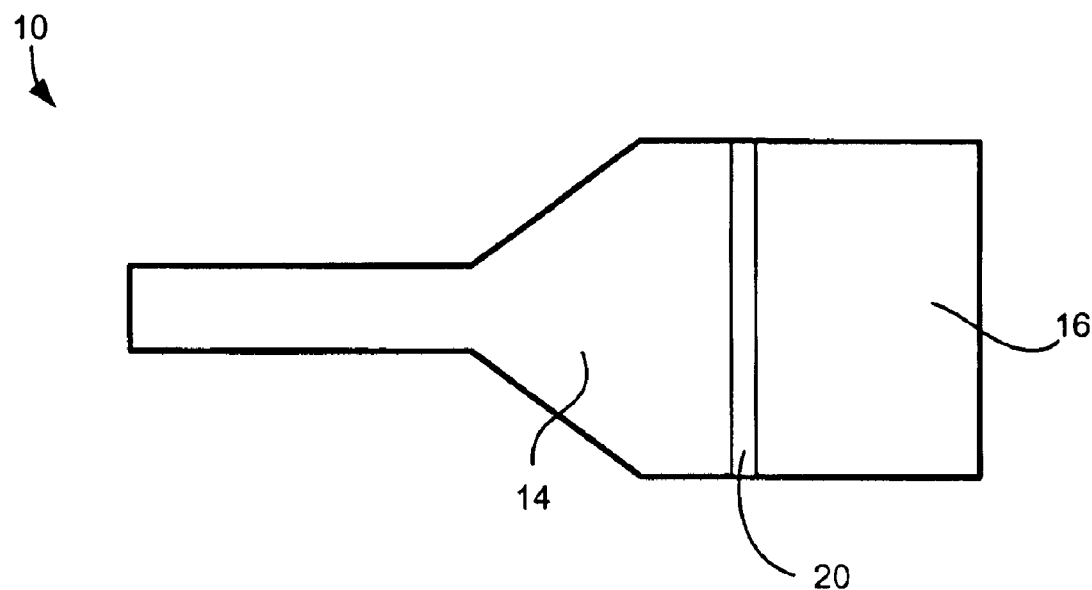
FIG. 3 is a left side view of a tool for installing an electrical box in accordance with an embodiment of the present disclosure.

Preferred embodiments of the present disclosure will be described hereinbelow with reference to the accompanying drawings. In the following description, well-known functions or constructions are not described in detail to avoid obscuring the invention in unnecessary detail. Throughout the drawings, like reference numerals represent like elements.

Referring to FIGS. 1 through 4, a tool 10 for installing electrical boxes is provided. The tool 10 includes a holding assembly 12 for holding an electrical box and a depth adjuster 14 for positioning the electrical box a predetermined distance relative to a framing member of a structure, e.g., a wood or metal stud. The holding assembly 12 includes a rectangular shape holding member 16 for securely holding the electrical box in place. A width w of the holding member 16 is dimensioned to be slightly smaller than a height of the electrical box, so in operation, the electrical box will snuggly slide over the holding member as will be describe in more detail below. The holding assembly 12 further includes a handle 18 for a user to position the tool 10 in relation to the framing member.

Figure 4:
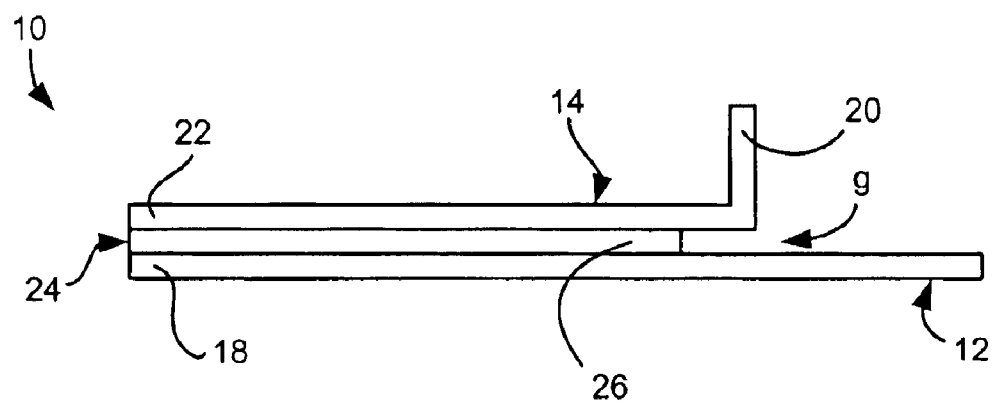
FIG. 4 is a top plan view of a tool for installing an electrical box in accordance with an embodiment of the present disclosure.

As best seen in FIGS. 1 and 4, the depth adjuster 14 is an L-shaped member which has a first end 20 configured for abutting the framing member to set an opening of the electrical box at a predetermined depth relative to the face of the framing member. A second end 22 of the depth adjuster is configured in substantially the same shape as the handle 18 to facilitate handling of the tool 10.

The tool 10 further includes a spacer member 24 which is configured similar to the holding assembly 12. However, a first end 26 of the spacer member 24 is shorter than holding member 16 so that when assembled, gap "g" is formed to allow a side wall of the electrical box to enter further securing the electrical box.

The holding assembly 12, depth adjuster 14 and spacer member 24 may be separately injection molded of any known plastic and joined together by an adhesive, a butt welding process or by any other known means in the art. Alternatively, the tool 10 may be molded as a unitary item.

The tool 10 further includes height adjuster 28 for positioning the electrical box a predetermined height above a floor. The height adjuster will include a mechanism for adjustably securing a mast, rod or support member to the tool 10 for installing the electrical box at the predetermined height, as will be described in more detail below. As shown in FIG. 1, the height adjuster 28 includes a C-strap 30 for accepting the mast and a bolt 32 and wing nut 34 to secure the mast at the predetermined height. The height adjuster may be any known mechanism for securing the support member to the tool such as a one-hole EMT fitting strap, a two-hole EMT fitting strap or conduit hanger. The height adjuster 28 is attached to the holding assembly 12 by a fastener 36 or any known fastening means as shown best in FIG. 2. Preferably, the fastener 36 will allow the height adjuster 28 to rotate so that the tool 10 can be employed for setting an electrical box on either the left or right side of a framing member.

Figure 5:
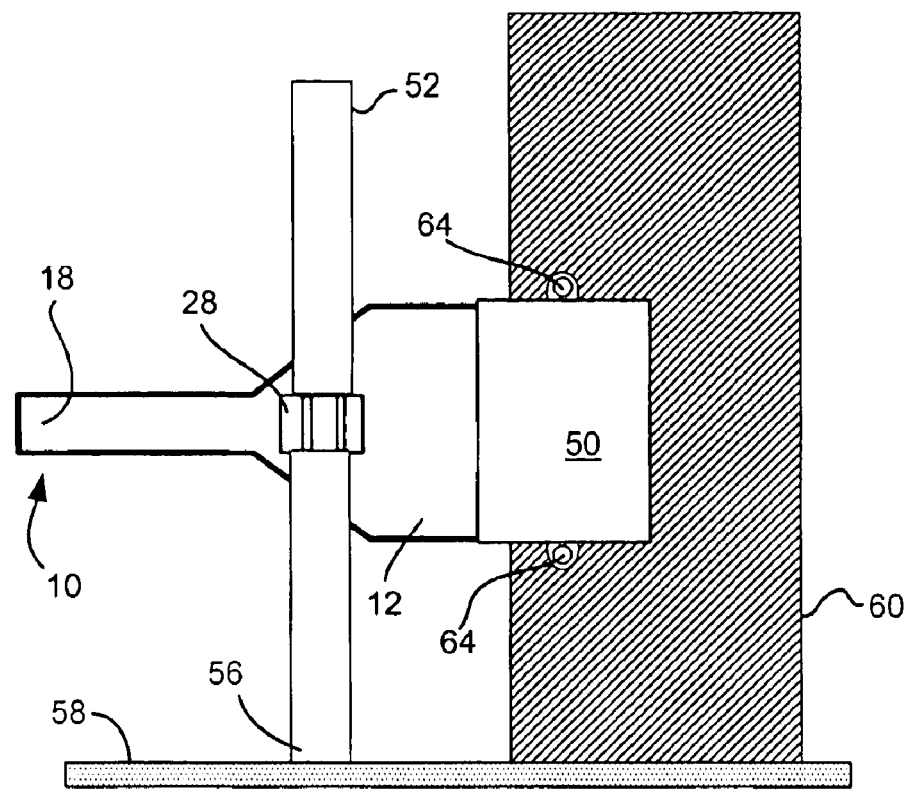
FIG. 5 is a right side view illustrating a tool in accordance with an embodiment of the present disclosure being employed to install an electrical box adjacent to a building framing member.
Figure 6:
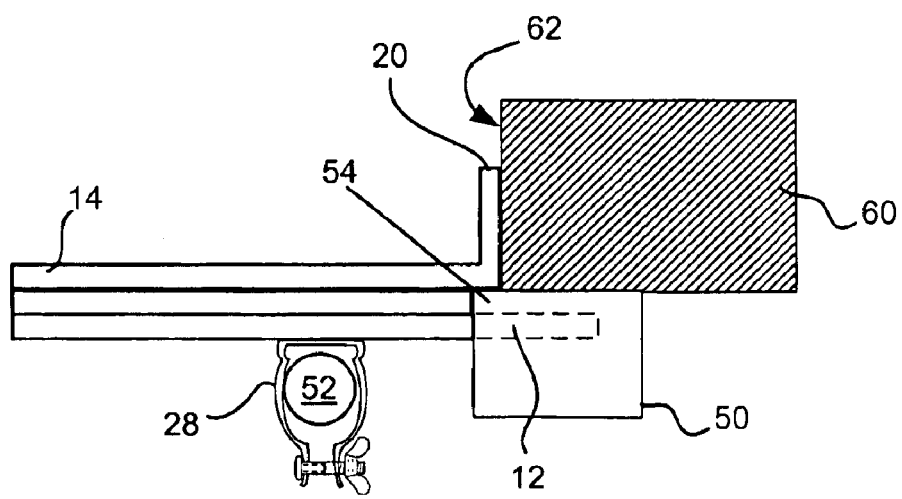
FIG. 6 is a top plan view illustrating a tool in accordance with an embodiment of the present disclosure being employed to install an electrical box adjacent to a building framing member.
Figure 7:
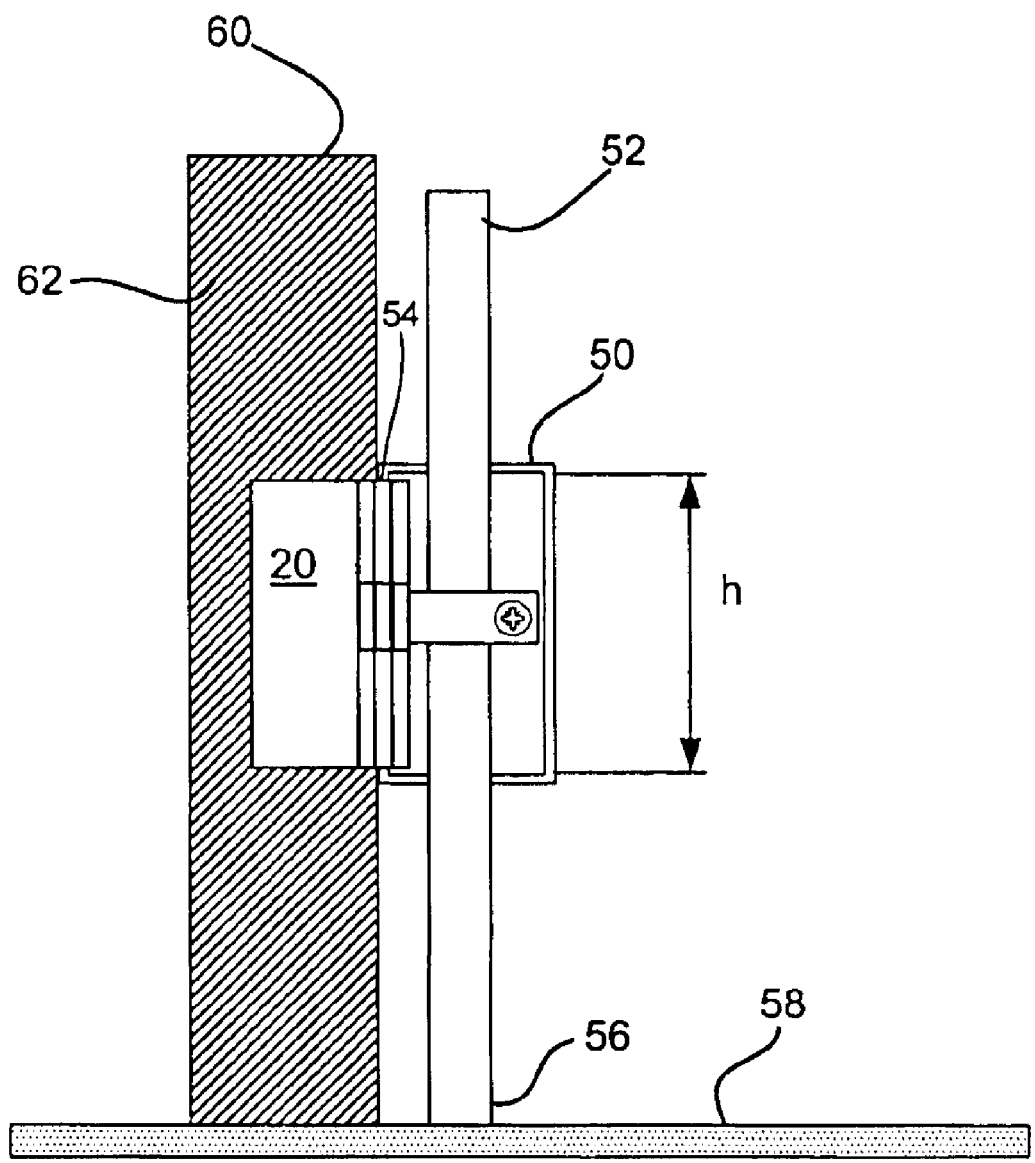
FIG. 7 is a front side view illustrating a tool in accordance with an embodiment of the present disclosure being employed to install an electrical box adjacent to a building framing member.

Referring to FIGS. 5 through 7, a method for installing an electrical box using a tool according to the present disclosure will be described.

Initially, a mounting height of the electrical box 50 will be determined. A support member 52 of a height slightly longer than the predetermined height above the floor is secured to the height adjuster 28 of the tool 10. Preferably, the support member 52 is a length of electrical metallic tubing (EMT) or conduit which is readily available to most electricians.

Next, the electrical box 50 is placed on the holding member 12 of the tool. Preferably, a height h of the open end of the electrical box 50 is only slightly larger than width w of the holding member 12 so the electrical box 50 fits snuggly on the holding member 12. Additionally, a wall 54 of the electrical box 50 will enter gap g of the tool further securing the electrical box 50 to the tool 10.

A lower end 56 of the support member 52 is then placed on the floor 58 in close proximity to a desired framing member 60, while the user grasps the handle 18 to position the tool 10. The user then brings the first member 20 of the depth adjuster 14 in contact with a face 62 of the framing member 60. By placing the depth adjuster 14 in flush contact with the face 62 of the framing member 60, the tool 10 will position the electrical box 50 at the predetermined depth relative to the face 62 of the framing member and at the predetermined height relative to the floor 58. Now, the electrical box 50 may be secured to the framing member by the appropriate fastener 64, e.g., nails for a wood stud or screws for metal studs. The tool 10 is then simply slid out of the electrical box 50 and the electrical box is set.

Figure 8A:
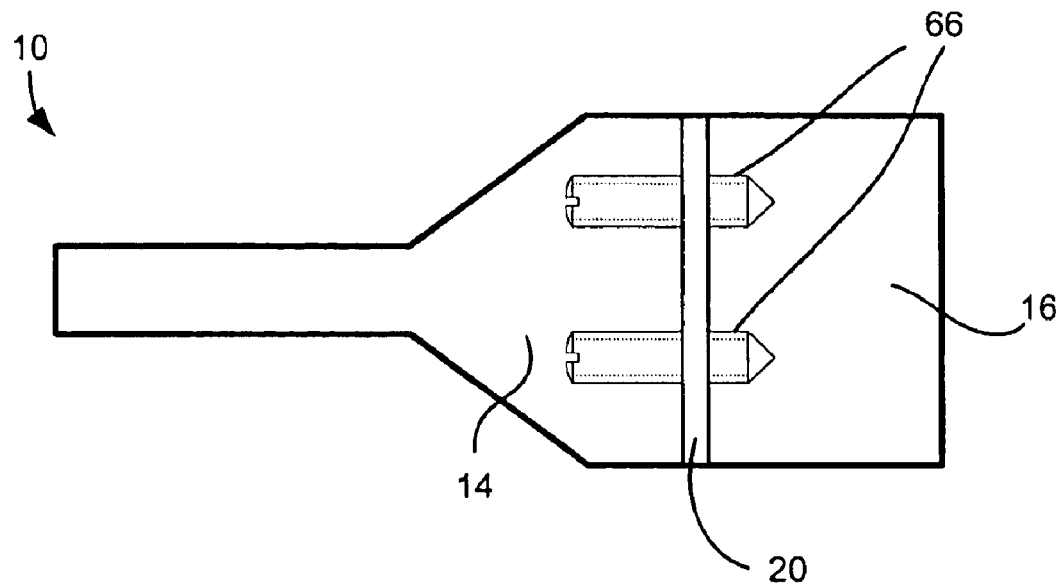
FIG. 8A is a left side view illustrating a tool in accordance with an embodiment of the present disclosure including a depth adjusting mechanism and FIG. 8B is a top plan view of the tool shown in FIG. 8A being employed to install an electrical box adjacent to a building framing member.
Figure 8B:
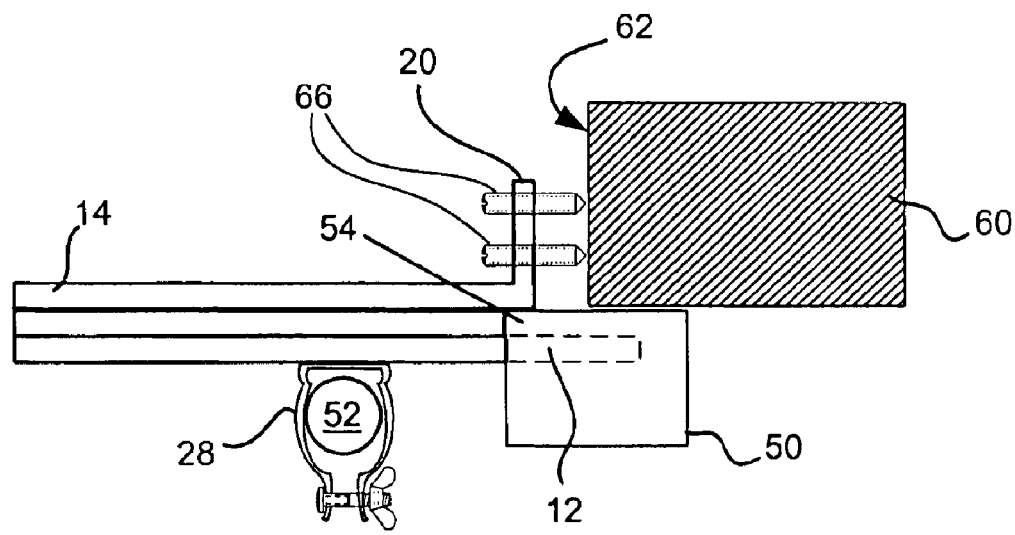

Referring to FIGS. 8A and 8B, the tool 10 may include a mechanism 66 for adjusting the depth of the electrical box 50 relative to the face of the framing member 60. At least one set screw 66 may be disposed within the first end 20 of depth adjuster 14 for setting the depth placement of the electrical box 50. The set screw 66 can be variably positioned simply with a screw driver. Once the set screw 66 is set and following the procedure described above, an end of the set screw 66 will abut the face 62 of framing member 60 and allow the user to set the electrical box 50 using the appropriate fastener, as shown in FIG. 8B. Preferably, the tool 10 will include at least two set screws 66 to stabilize the tool as the set screws 66 come into contact with the framing member 60.

Figure 9:
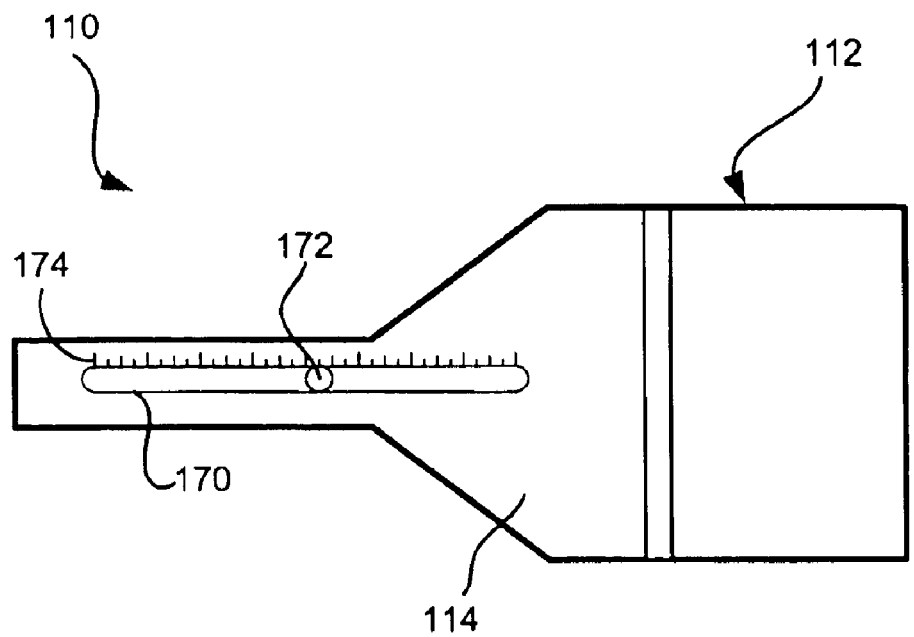
FIG. 9 is a left side view of a tool for installing an electrical box in accordance with another embodiment of the present disclosure.

Referring to FIG. 9, a further embodiment of a tool 110 for installing an electrical box is illustrated. Here, the depth adjuster 114 is formed with a longitudinal slot 170 and coupled to the tool 110 with a fastener 172. The slot 170 allows the depth adjuster 114 to slide in relation to the holding assembly 112 to set different depth distances. Furthermore, a plurality of graduations 174 are located above the slot 170 to assist the user in setting the depth adjuster 114 to a desired depth. It is to be appreciated that the depth distance will depend based on the thickness of the wall covering, e.g., sheet rock.

Figure 10:
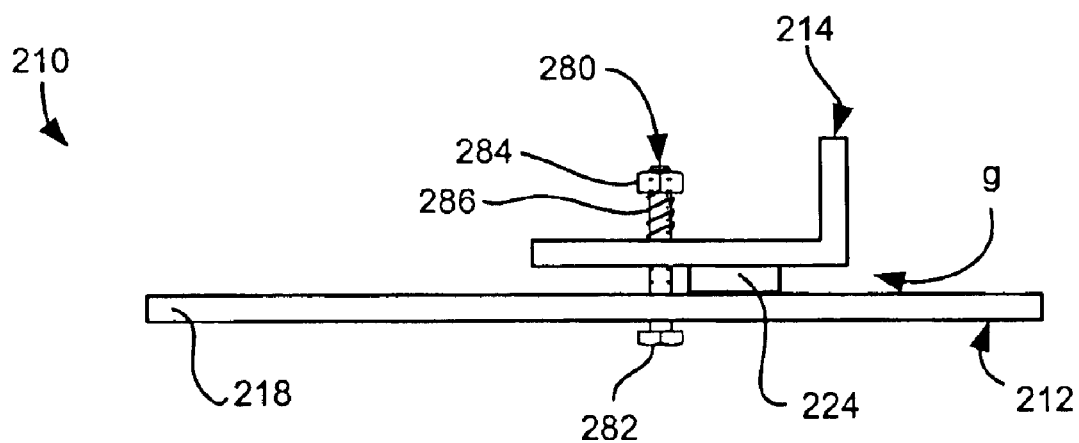
FIG. 10 is a top plan view of a tool for installing an electrical box in accordance with a further embodiment of the present disclosure.

Another embodiment of a tool for installing an electrical box is shown in FIG. 10. In this embodiment, the tool 210 includes holding assembly 212 and depth adjuster 214. Here, the depth adjuster 214 is an L-shaped member which acts substantially similar to the depth adjuster 14 described above. However, depth adjuster 214 is shorter than adjuster 14 and does not cover handle 218. The depth adjuster 214 is coupled to holding assembly 212 via a spring loaded fastener 280. The spring loaded fastener 280 includes a bolt 282, a nut 284 and a spring 286 disposed between the nut 284 and the depth adjuster 214. BY employing a spring loaded fastener, the depth adjuster 214 will move relative to the holding assembly 212 to accommodate electrical boxes having walls of varying thickness. In other words, gap g will vary according to the wall thickness of the electrical box. In use, the tool 210 will function as described above. For stability, a spacer member 224 may be disposed between the holding member 212 and depth adjuster 214, for example, a piece of plastic having a width of the holding member or at least one washer disposed about the bolt 284.

By employing a tool according to the present disclosure, a user, e.g., an electrician, can install a plurality of electrical boxes rapidly and uniformly without further adjustment to the tool once it is set, resulting in shorter installation times. Since the tool can be coupled to a variety of support members, e.g., conduit, a rod, a wooden stick, etc., the user can most likely improvise to form the support member with materials found on a typical jobsite, and therefore, would only need to carry around the tool which can easily fit in a small tool box or bag.

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. A tool for installing an electrical box comprising:
   a holding assembly configured to hold an electrical box to be mounted on a framing member, the holding assembly including a holding member configured to contact an inner side wall of the electrical box;
   a depth adjuster configured to position the electrical box a predetermined distance relative to a face of the framing member; and
   a height adjuster configured to position the electrical box a predetermined height relative to a floor.

2. The tool as in claim 1, wherein the holding member is rectangular shaped and a width of the holding member is less than a height of an opening of the electrical box.

3. The tool as in claim 1, further comprising a handle for positioning the tool in relation to the framing member.

4. The tool as in claim 1, wherein the depth adjuster is L-shaped and has a first end for abutting the framing member to set the electrical box at the predetermined distance relative to the face of the framing member.

5. The tool as in claim 4, wherein the first end of the depth adjuster includes a mechanism for variably adjusting the predetermined distance.

6. The tool as in claim 1, further comprising a spacer member for coupling the holding assembly and depth adjuster, wherein the spacer member forms a gap between the holding assembly and depth adjuster at a first end of the tool for accepting a wall of the electrical box to securely hold the electrical box.

7. The tool as in claim 8, wherein the gap is variably adjustable.

8. The tool as in claim 1, wherein the height adjuster couples a support member to the tool, wherein the support member positions the tool at the predetermined height.

9. The tool as in claim 8, wherein the height adjuster is rotatable so the electrical box can be installed on a left side or right side of the framing member.

10. The tool as in claim 8, wherein the support member is electrical metallic tubing (EMT).

11. The tool as in claim 1, wherein the depth adjuster includes a longitudinal slot for allowing the depth adjuster to slide relative to the holding assembly for setting the predetermined distance.

12. The tool as in claim 11, wherein the slot includes a plurality of graduations for setting the predetermined distance.

13. A method for installing an electrical box, the method comprising the steps of:
   providing a tool comprising:
      a holding assembly configured to hold an electrical box to be mounted on a framing member, the holding assembly including a holding member configured to contact an inner side wall of the electrical box;
      a depth adjuster configured to position the electrical box a predetermined distance relative to a face of the framing member; and
      a height adjuster configured to position the electrical box a predetermined height relative to a floor;
   coupling a support member to the height adjuster for setting the predetermined height;
   placing the electrical box on the holding member;
   positioning a lower end of the support member on the floor in close proximity to the framing member;
   abutting the depth adjuster to a face of the framing member; and
   securing the electrical box to the framing member.

14. The method as in claim 13, wherein the holding member is rectangular shaped and a width of the holding member is less than a height of an opening of the electrical box.

15. The method as in claim 13, further comprising a handle for positioning the tool in relation to the framing member.

16. The method as in claim 13, wherein the depth adjuster is L-shaped and has a first end for abutting the framing member to set the electrical box at the predetermined distance relative to the face of the framing member.

17. The method as in claim 16, wherein the first end of the depth adjuster includes a mechanism for variably adjusting the predetermined distance.

18. The method as in claim 13, further comprising a spacer member for coupling the holding assembly and depth adjuster, wherein the spacer member forms a gap between the holding assembly and depth adjuster at a first end of the tool for accepting a wall of the electrical box to securely hold the electrical box.

19. The method as in claim 18, wherein the gap is variably adjustable.

20. The method as in claim 13, wherein the height adjuster couples a support member to the tool, wherein the support member positions the tool at the predetermined height.

21. The method as in claim 20, wherein the height adjuster is rotatable so the electrical box can be installed on a left side or right side of the framing member.

22. The method as in claim 20, wherein the support member is electrical metallic tubing (EMT).

23. The method as in claim 13, wherein the depth adjuster includes a longitudinal slot for allowing the depth adjuster to slide relative to the holding assembly for setting the predetermined distance.

24. The method as in claim 23, wherein the slot includes a plurality of graduations for setting the predetermined distance.

* * * * *